Nov. 30, 1937.   A. F. MARCOTT   2,100,565
AUTOMATIC CHANGE SPEED TRANSMISSION
Filed July 14, 1934   2 Sheets-Sheet 1
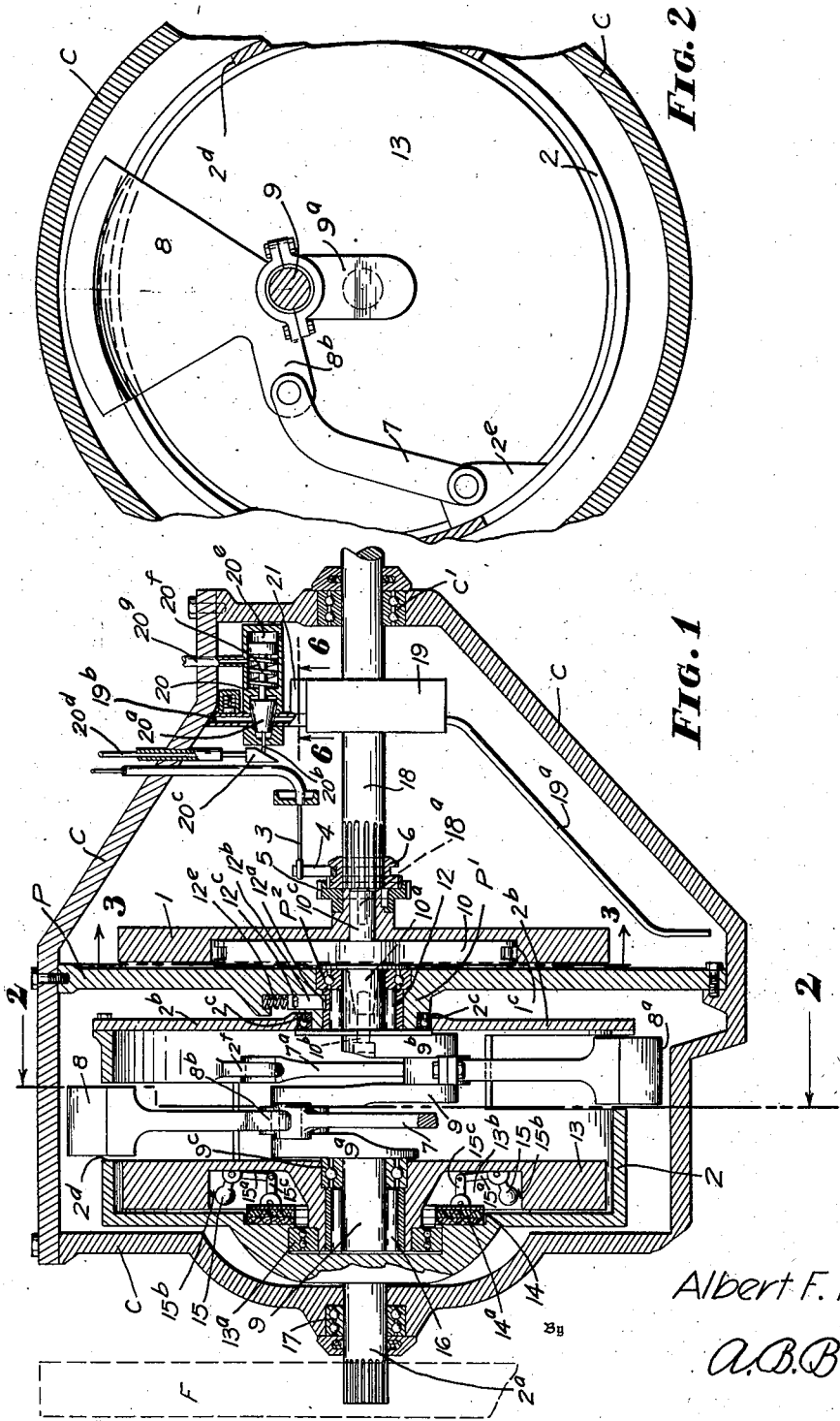
Inventor
Albert F. Marcott
A. B. Bowman
Attorney Nov. 30, 1937.  A. F. MARCOTT  2,100,565

AUTOMATIC CHANGE SPEED TRANSMISSION

Filed July 14, 1934    2 Sheets-Sheet 2

Inventor
Albert F. Marcott

A.B.Bowman
Attorney

Patented Nov. 30, 1937

2,100,565

UNITED STATES PATENT OFFICE 2,100,565

AUTOMATIC CHANGE SPEED TRANSMISSION

Albert F. Marcott, San Diego, Calif.

Application July 14, 1934, Serial No. 735,219

19 Claims. (Cl. 74—64)

My invention relates to an automatic change speed transmission, and the objects of my invention are:

First, to provide a transmission for transmitting power particularly adapted for vehicles in which the speed and power relation are changed automatically as required;

Second, to provide a transmission of this class which is silent and the noise eliminated with the change of speed;

Third, to provide a transmission of this class which provides an infinite variety of speeds therefore providing great flexibility in operation;

Fourth, to provide a transmission of this class which is revoluble throughout and uses no reciprocating parts for the general operation;

Fifth, to provide a transmission of this class in which the friction throughout is reduced to a minimum;

Sixth, to provide a transmission of this class in which the driven shaft may be driven at a very high ratio and therefore increasing economy of operation; and Seventh, to provide a transmission of this class which is very simple and economical of construction, efficient in its action, and which will not readily deteriorate or get out of order.

Figure 3:
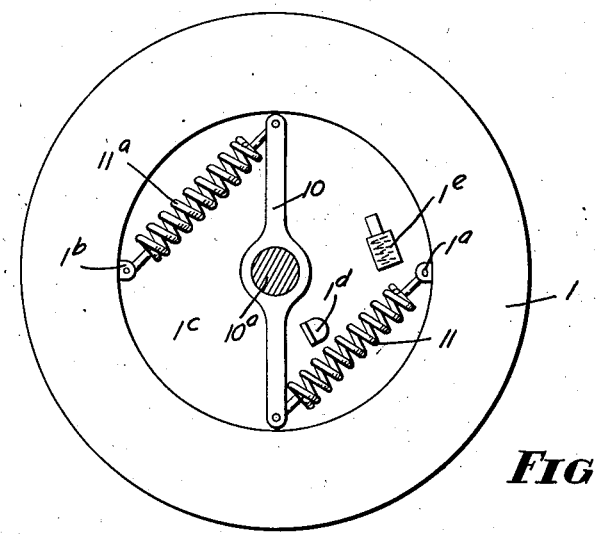
Figure 4:
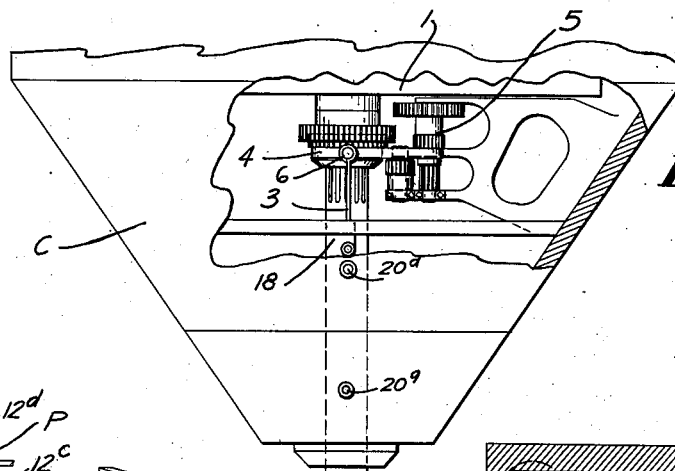
Figure 5:
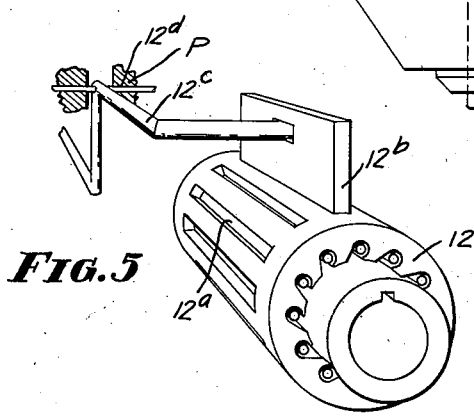
Figure 6:
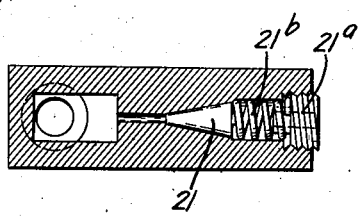

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional view of my transmission complete showing some of the parts and portions in elevation to facilitate the illustration; Fig. 2 is a sectional view from the line 2—2 of Fig. 1 showing some of the parts in elevation to facilitate the illustration; Fig. 3 is a sectional view from the line 3—3 of Fig. 1; Fig. 4 is a top or plan view of a fragmentary portion of the rear end of the transmission showing portions broken away and in section to facilitate the illustration; Fig. 5 is a perspective view showing diagrammatically the clutch 12 on an enlarged scale and a portion of its control mechanism in connection therewith, and Fig. 6 is a sectional view on an enlarged scale through 6—6 of Fig. 1.

Similar characters of reference refer to similar parts and portions throughout the several views of the drawings.

The casing C, fly wheel 1, drum 2, cable 3, reverse gear shifting member 4, reverse gearing 5, collar 6, connecting rods 7 and 7a, weights 8 and 8a, crank shaft 9, arm member 10, springs 11 and 11a, clutch 12, fly wheel 13, friction disks 14 and 14a, weights 15, clutch 16, bearings 17, driven shaft 18, pump 19, and automatic control valve 20, constitute the principal parts and portions of my transmission mechanism.

The casing C is a stationary casing preferably positioned back of the engine fly wheel F. It is made in sections suitable for positioning the parts internally therein as desired. It is provided with a bearing 17 in the one end which is adapted to receive the shaft 2a which is secured to the drum 2. In the other end is provided a bearing C1 in which is mounted the driven shaft 18. Mounted transversely across this casing C is a partition member P. It will be here noted that the casing C and partition P are secured stationarily relatively to the engine casing in any suitable manner. The shaft 2a is secured in connection with the fly wheel F of the engine and revolubly mounted in the casing C at one end by means of the bearing 17. To the shaft 2a is secured the drum member 2, preferably integral therewith. This drum 2 is annular in form and is provided at the opposite side from the shaft 2a with a cover member 2b secured thereto. This cover member 2b is mounted on bearings 2c which are supported on an annular extended portion P1 of the partition P, all as shown best in Fig. 1 of the drawings. Thus the drum 2 is revoluble by means of the shaft 2a and the bearing 17 and the bearings 2c supporting the cover member 2b. Mounted centrally in the drum in alinement with the shaft 2a is a crank shaft 9 which is provided with oppositely disposed crank portions 9a and 9b. The one end of the crank shaft 9 is supported in bearings 9c which are in turn mounted in the hub of a fly wheel 13, and the fly wheel 13 is supported by means of bearings 13a mounted in the drum 2.

Positioned around the end of the crank shaft 9 in the hub of the fly wheel 13 is a one-way clutch 16 which is a roller clutch, but sometimes called an over-running or free-wheeling clutch, of conventional type. The other end of the shaft 9 is revolubly mounted by means of the bearings P2 in the partition P and positioned around this end of the shaft 9 is a similar clutch to the clutch 16 which is designated 12. The forms of the clutches 12 and 16 are shown best in Fig. 5 of the drawings. However, the clutch 12 is provided in its outer surface with a plurality of slots 12a therein into which are adapted to be inserted a lock member 12b which is supported and adapted to be operated by means of a bell crank member 12c which is pivotally mounted on the partition P by means of slots 12d, all as shown best in Figs. 5 and 1 of the drawings. Back of the member 12b are springs 12e, shown in Fig. 1 of the drawings, tending to hold the member 12b in the slots 12a of the member 12. These springs 12e are positioned in a slot in the partition P, shown best in Fig. 1 of the drawings.

The fly wheel 13 is provided with a cut-away portion 13b in which is pivotally mounted a plurality of bell cranks 15a. Upon one member of each is mounted a weight 15 and to which is connected a spring 15b which tends to pull said weight outwardly. At the other extremity of the bell cranks 15a is a link member 15c to the one end of which is pivotally connected a friction disk 14 which is adapted to engage another friction disk 14a mounted in the drum 2 which forms a breaking relation between the drum and the fly wheel 13 operated or controlled by centrifugal force by means of the weights 15 in connection with the friction disks 14 and 14a.

Mounted revolubly with the portion 9a of the crank shaft 9 is a weight 8, shown best in Figs. 1 and 2 of the drawings. This weight 8 is positioned normally outwardly from the shaft 9, as shown best in Fig. 2, and its outer side extends through a slot 2d which extends about one-third of the way around the upper side of the drum 2. This weight 8 is provided with a latterly extending lug 8b to which is connected a connecting rod 7 which is curved at its opposite end to provide a clearance in its movement and the other end of said connecting rod 7 is pivotally mounted on a lug 2e. Revolubly mounted with the portion 9b of the crank shaft 9 is a weight 8a which is the same in construction as the weight 8 and connected with the weight 8a is a connecting rod 7a which is similar to the connecting rod 7. It will be noted however that the connecting rod is pivotally connected to a lug 2f on the opposite side of the drum 2 from the lug 2e so that the weight 8 and connecting rod 7 are positioned in opposed direction to the weight 8a and connecting rod 7a, as shown best in Fig. 1 of the drawings.

It will be here noted that the drum 2, fly wheel 13, crank shaft 9 are all freely movable relatively to each other, except under conditions as will be hereinafter described.

Mounted on the opposite side of the partition P from the drum 2 is an arm member 10 which is supported on the end of the crank shaft 9 by means of a tapered portion 10a, shown by dotted lines in Fig. 1 of the drawings, which extends into the end of the crank shaft 9 and is supported by means of a bolt 10b, shown also by dotted lines in Fig. 1 of the drawings, and is also keyed thereon as shown in Fig. 3 of the drawings.

Mounted on the other side of this arm member 10 from the tapered portion 10a is a stub shaft 10c. This stub shaft 10c is provided with a central bore in its end in which is mounted an extended portion 18a of a driven shaft 18, as shown by dotted lines in Fig. 1 of the drawings. Revolubly mounted on the stub shaft 10c is a fly wheel 1 which is provided with a recess 1c in one side in which is mounted the extended arm members of the member 10, and connected with the opposite end of the arm member 10 are springs 11 and 11a which are tension springs, the other ends of which are secured in lugs 1a and 1b on the wheel 1, all as shown best in Fig. 2 of the drawings. This wheel 1 is also provided in the recess 1c with a stop lug 1d to stop the arm member in its backward movement when the transmission is not in action, and also with a bumper member 1e mounted also in the recess 1c which is adapted to engage one of the arm members of the arm member 10 in case the springs should break for moving the wheel 1 when the arm members are turned to such position.

Secured on the hub of the wheel 1 is a gear member which is one of a plurality of conventional reverse gears, which reverse gears are shown best in Fig. 4 of the drawings, operated by means of a collar 6 which operates the conventional reverse gearing 5 by means of a reverse gear shifting member 4 controlled by a cable 3 which extends to the dash of the vehicle in position to be operated by the driver of the vehicle.

Mounted in connection with the driven shaft 18 is a pump 19 which is preferably a gear pump which pumps oil from the bottom of the casing C through the tube 19a upwardly through the tube 19b and to the walls of the casing to various parts of the transmission mechanism for lubrication. This pump 19 also serves the purpose of providing a coasting control as follows: The pump 19 draws oil from the bottom of the casing C through the tube 19a and delivers it through the tube 19b under control of the automatic control valve 20. If the tapered portion 20a of the automatic control valve 20 is in its rearmost position the oil will flow past it without offering any resistance to the rotation of the shaft 18 and consequently the vehicle will roll or coast freely. If this tapered portion 20a however be in its forward position the resistance will be great enough to nearly lock the rear wheels of the vehicle which would happen if it were not for the relief valve 21, shown best in Fig. 6 of the drawings, which is adjustable by means of the adjusting screw 21a and supported by the spring 21b.

The tapered portion 20a is provided with an extended portion 20b which engages a beveled or tapered member 20c which is controlled from the dash by a plunger rod 20d. When the member 20c is pulled up the stroke of the tapered portion 20a of the automatic valve 20 is not limited and when the vacuum is strong in the cylinder 20e the cylinder will force the member 20a against the action of the spring 20f to its foremost position thus providing a maximum resistance. If the member 20c is depressed sufficiently it will stop the stroke of the member 20a slightly and the resistance to the forward motion of the vehicle will be relieved, depending upon the position of the member 20c, thus providing great variable coasting resistance from the dash of the vehicle. In order to avoid this resistance and prevent a drag on the motor while it is accelerating the automatic control valve 20 is provided.

It will be noted that to provide the proper operation the pump 19 should be a reverse pump.

It will also be noted that this valve 20 is provided with a tube 20g which connects with the intake manifold of the motor to provide vacuum action of this automatic valve. It is well known that the vacuum in the intake manifold of a gas motor drops considerably when the accelerator is depressed, so it will be readily seen that with the accelerator depressed the vacuum in the cylinder 20e will be low and will allow the pistons to move rearwardly removing all resistance and will remain thus as long as the accelerator is depressed. However, when the foot is raised from the accelerator the vacuum becomes strong in the cylinder 20e and the member 20a is moved forward to such position as is permitted by this member 20c. It will thus be seen that the operator may set the dash plunger to such a position of coasting resistance that he can glide up to a stop position and stop the vehicle by merely raising his foot from the accelerator; that he can adjust the dash plunger to provide a gentle or abrupt stop as desired. The member 20c can also be controlled manually by the left foot.

The operation of the transmission is as follows: The operator pulls the control plunger on the dash part way out actuating the cable 3 which moves the shifting member 4 moving the gear 5 and collar 6 to neutral position. The starter is then depressed and after the motor is warmed up the control plunger is pushed all the way in shifting the gear 5 and collar 6 to the forward position. Then the emergency brake lever is released and the vehicle is now ready to drive. When the accelerator is depressed the automatic clutch is engaged and the shaft 2a begins to rotate. Since the drum 2 is a part of the shaft it also turns carrying with it the connecting rods 7, which in turn cause the weights 8 to rotate about the crank shaft 9. These weights impart two major and two minor impulses in the direction of rotation to the shaft in each revolution. These impulses vary in intensity in proportion to the speed of the motor. It will be seen that to the crank shaft 9 is secured the arm member 10 which has the two long arms at the ends of which are secured two heavy springs 11 and 11a. These springs ordinarily hold the arms against the bumper 1e. Then the pulsations from the shaft 9 cause the arm member 10 to move a certain amount with each pulsation stretching the springs 11 and 11a until the fly wheel 1 to which they are secured begins to turn also turning the driven shaft 18. The vehicle is now in motion and the speed of the motor is increased and through the inertia and momentum of the weights causes said weights to impart heavier and heavier impulses to the springs 11 and 11a thereby increasing the speed of the fly wheel 1 and the shaft 18. This action continues gradually until the revolving weights become affected by centrifugal force at which time they will cease to revolve around the shaft journals and will revolve with the shaft as a mass instead. The transmission is now in direct or high.

The object of the fly wheel 13 is to follow up the pulsating motion of the crank shaft and through its one-way clutch, prevents the shaft from coming to a stop between pulsations. This condition obtains only at low speeds. The clutch 12 performs the same function when starting from a standstill. Approximately, the clutch 12 operates from zero to three miles per hour, and clutch 16 from three to ten miles per hour.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an automatic change speed transmission, a revolubly mounted drum, a crank shaft revoluble relatively to said drum, weights positioned in oppositely disposed relation to each other on separate crank portions of said crank shaft, each of said weights provided with laterally extending rigidly connected arms, and connecting rods connecting each of said arms with said drum on the opposite side of said drum from said weights, an arm member secured to the one end of said crank shaft provided with oppositely disposed arm portions, a fly wheel mounted in connection with said arm member revoluble relatively thereto, and springs connecting the extended ends of said arms with said fly wheel whereby said fly wheel is turned by said crank shaft through said arms and springs.

2. In an automatic change speed transmission, a revolubly mounted drum, a crank shaft revoluble relatively to said drum, weights positioned in oppositely disposed relation to each other on separate crank portions of said crank shaft, each of said weights provided with laterally extending rigidly connected arms, and connecting rods connecting each of said arms with said drum on the opposite side of said drum from said weights, an arm member secured to the one end of said crank shaft provided with oppositely disposed arm portions, a fly wheel mounted in connection with said arm member revoluble relatively thereto, springs connecting the extended ends of said arms with said fly wheel whereby said fly wheel is turned by said crank shaft through said arms and springs, and a driven shaft in alinement with said crank shaft and concentric with said arm member and fly wheel.

3. In an automatic change speed transmission, a revolubly mounted drum, a crank shaft revoluble relatively to said drum, weights positioned in oppositely disposed relation to each other on separate crank portions of said crank shaft, each of said weights provided with laterally extending arms, and connecting rods connecting each of said arms with said drum on the opposite side of said drum from said weights, an arm member secured to the one end of said crank shaft provided with oppositely disposed arm portions, a fly wheel mounted in connection with said arm member revoluble relatively thereto, springs connecting the extended ends of said arms with said fly wheel whereby said fly wheel is turned by said crank shaft through said arms and springs, a driven shaft in alinement with said crank shaft and concentric with said arm member and fly wheel, and reverse gear mechanism mounted in connection with said driven shaft for providing neutral and reverse gear relationship.

4. In an automatic change speed transmission, a revolubly mounted drum, a crank shaft revoluble relatively to said drum, weights positioned in oppositely disposed relation to each other on separate crank portions of said crank shaft, each of said weights provided with laterally extending arms, and connecting rods connecting each of said arms with said drum on the opposite side of said drum from said weights, an arm member secured to the one end of said crank shaft provided with oppositely disposed arm portions, a fly wheel mounted in connection with said arm member revoluble relatively thereto, springs connecting the extended ends of said arms with said fly wheel whereby said fly wheel is turned by said crank shaft through said arms and springs, a driven shaft in alinement with said crank shaft and concentric with said arm member and fly wheel, reverse gear mechanism mounted in connection with said driven shaft for providing neutral and reverse gear relationship, and pump and automatic valve control means in connection with said driven shaft for controlling the movement of said driven shaft.

5. In an automatic change speed transmission, a revolubly mounted drum, a crank shaft revoluble relatively to said drum, weights positioned in oppositely disposed relation to each other on separate crank portions of said crank shaft, each of said weights provided with laterally extending arms, and connecting rods connecting each of said arms with said drum on the opposite side of said drum from said weights, an arm member secured to the one end of said crank shaft provided with oppositely disposed arm portions, a fly wheel mounted in connection with said arm member revoluble relatively thereto, springs connecting the extended ends of said arms with said fly wheel whereby said fly wheel is turned by said crank shaft through said arms and springs, a driven shaft in alinement with said crank shaft and concentric with said arm member and fly wheel, reverse gear mechanism mounted in connection with said driven shaft for providing neutral and reverse gear relationship, pump and automatic valve control means in connection with said driven shaft for controlling the movement of said driven shaft, and a casing enclosing all of said described mechanism.

6. In an automatic change speed transmission, a revolubly mounted drum, a crank shaft revoluble relatively to said drum, weights positioned in oppositely disposed relation to each other on separate crank portions of said crank shaft, each of said weights provided with laterally extending arms, and connecting rods connecting each of said arms with said drum on the opposite side of said drum from said weights, an arm member secured to the one end of said crank shaft provided with oppositely disposed arm portions, a fly wheel mounted in connection with said arm member revoluble relatively thereto, springs connecting the extended ends of said arms with said fly wheel whereby said fly wheel is turned by said crank shaft through said arms and springs, a driven shaft in alinement with said crank shaft and concentric with said arm member and fly wheel, reverse gear mechanism mounted in connection with said driven shaft for providing neutral and reverse gear relationship, pump and automatic valve control means in connection with said driven shaft for controlling the movement of said driven shaft, a casing enclosing all of said described mechanism, and a partition in said casing extending transversely therewith for supporting one end of said crank shaft positioned intermediate the ends of said casing.

7. In an automatic change speed transmission, a revolubly mounted drum, a crank shaft revoluble relatively to said drum, weights positioned in oppositely disposed relation to each other on separate crank portions of said crank-shaft, each of said weights provided with laterally extending arms, and connecting rods connecting each of said arms with said drum on the opposite side of said drum from said weights, an arm member secured to the one end of said crank shaft provided with oppositely disposed arm portions, a fly wheel mounted in connection with said arm member revoluble relatively thereto, springs connecting the extended ends of said arms with said fly wheel whereby said fly wheel is turned by said crank shaft through said arms and springs, a driven shaft in alinement with said crank shaft and concentric with said arm member and fly wheel, reverse gear mechanism mounted in connection with said driven shaft for providing neutral and reverse gear relationship, pump and automatic valve control means in connection with said driven shaft for controlling the movement of said driven shaft, a casing enclosing all of said described mechanism, a partition in said casing extending transversely therewith for supporting one end of said crank shaft positioned intermediate the ends of said casing, a fly wheel mounted in said drum revoluble relatively to said drum and relatively to said crank shaft, weighted bell cranks mounted relatively to said fly wheel, and friction disk means operable by said bell cranks connected with said fly wheel and said drum for controlling the relative movement of said fly wheel with said drum by centrifugal action.

8. In an automatic change speed transmission, a drum member in operative connection with the main shaft of an engine provided with slots in the periphery in opposed offset relation to each other, a crank shaft revolubly mounted in said drum, weights mounted on opposed crank portions of said crank shaft with their outer edges protruding through said slots in said drum each of said weights provided with a laterally extending arm, a connecting rod connected with each arm and its opposite end pivotally connected relatively to the drum at the opposite side of the drum from the weights, a fly wheel mounted in said drum revoluble relatively to said drum and to said crank shaft, said fly wheel provided with a plurality of extended bell cranks pivotally mounted relatively to said fly wheel, and friction disk means connected with said bell cranks and said drum for accelerating the movement of said fly wheel relatively to said drum by centrifugal action.

9. In an automatic change speed transmission, a drum member in operative connection with the main shaft of an engine provided with slots in the periphery in opposed offset relation to each other, a crank shaft revolubly mounted in said drum, weights mounted on opposed crank portions of said crank shaft with their outer edges protruding through said slots in said drum each of said weights provided with a laterally extending arm, a connecting rod connected with each arm and its opposite end pivotally connected relatively to the drum at the opposite side of the drum from the weights, a fly wheel mounted in said drum revoluble relatively to said drum and to said crank shaft, said fly wheel provided with a plurality of extended bell cranks pivotally mounted relatively to said fly wheel, friction disk means connected with said bell cranks and said drum for accelerating the movement of said flywheel relatively to said drum by centrifugal action, and a one-way clutch between said fly wheel and said crank shaft.

10. In an automatic change speed transmission, a drum member in operative connection with the main shaft of an engine provided with slots in the periphery in opposed offset relation to each other, a crank shaft revolubly mounted in said drum, weights mounted on opposed crank portions of said crank shaft with their outer edges protruding through said slots in said drum each of said weights provided with a laterally extending arm, a connecting rod connected with each arm and its opposite end pivotally connected relatively to the drum at the opposite side of the drum from the weights, a fly wheel mounted in said drum revoluble relatively to said drum and to said crank shaft, said fly wheel provided with a plurality of extended bell cranks pivotally mounted relatively to said fly wheel, friction disk means connected with said bell cranks and said drum for accelerating the movement of said fly wheel relatively to said drum by centrifugal action, a one-way clutch between said fly wheel and said crank shaft, an arm member provided with oppositely disposed arms secured to the one end of said crank shaft, a fly wheel revoluble relatively to said arm member, springs connecting the extended ends of said arms with said fly wheel.

11. In an automatic change speed transmission, a drum member in operative connection with the main shaft of an engine provided with slots in the periphery in opposed offset relation to each other, a crank shaft revolubly mounted in said drum, weights mounted on opposed crank portions of said crank shaft with their outer edges protruding through said slots in said drum each of said weights provided with a laterally extending arm, a connecting rod connected with each arm and its opposite end pivotally connected relatively to the drum at the opposite side of the drum from the weights, a fly wheel mounted in said drum revoluble relatively to said drum and to said crank shaft, said fly wheel provided with a plurality of extended bell cranks pivotally mounted relatively to said fly wheel, friction disk means connected with said bell cranks and said drum for accelerating the movement of said fly wheel relatively to said drum by centrifugal action, a one-way clutch between said fly wheel and said crank shaft, an arm member provided with oppositely disposed arms secured to the one end of said crank shaft, a fly wheel revoluble relatively to said arm member, springs connecting the extended ends of said arms with said fly wheel, and a one-way clutch in connection with said crank shaft adjacent said arm member for preventing the backward revolution of said crank shaft.

12. In an automatic change speed transmission, a drum member in operative connection with the main shaft of an engine provided with slots in the periphery in opposed offset relation to each other, a crank shaft revolubly mounted in said drum, weights mounted on opposed crank portions of said crank shaft with their outer edges protruding through said slots in said drum each of said weights provided with a laterally extending arm, a connecting rod connected with each arm and its opposite end pivotally connected relatively to the drum at the opposite side of the drum from the weights, a fly wheel mounted in said drum revoluble relatively to said drum and to said crank shaft, said fly wheel provided with a plurality of extended bell cranks pivotally mounted relatively to said fly wheel, friction disk means connected with said bell cranks and said drum for accelerating the movement of said fly wheel relatively to said drum by centrifugal action, a one-way clutch between said fly wheel and said crank shaft, an arm member provided with oppositely disposed arms secured to the one end of said crank shaft, a fly wheel revoluble relatively to said arm member, springs connecting the extended ends of said arms with said fly wheel, a one-way clutch in connection with said crank shaft adjacent said arm member for preventing the backward revolution of said crank shaft, a driven shaft, and clutch means for connecting and disconnecting said driven shaft with said fly wheel.

13. In an automatic change speed transmission, a drum member in operative connection with the main shaft of an engine provided with slots in the periphery in opposed offset relation to each other, a crank shaft revolubly mounted in said drum, weights mounted on opposed crank portions of said crank shaft with their outer edges protruding through said slots in said drum each of said weights provided with a laterally extending arm, a connecting rod connected with each arm and its opposite end pivotally connected relatively to the drum at the opposite side of the drum from the weights, a fly wheel mounted in said drum revoluble relatively to said drum and to said crank shaft, said fly wheel provided with a plurality of extended bell cranks pivotally mounted relatively to said fly wheel, friction disk means connected with said bell cranks and said drum for accelerating the movement of said fly wheel relatively to said drum by centrifugal action, a one-way clutch between said fly wheel and said crank shaft, an arm member provided with oppositely disposed arm secured to the one end of said crank shaft, a fly wheel revoluble relatively to said arm member, springs connecting the extended ends of said arms with said fly wheel, a one-way clutch in connection with said crank shaft adjacent said arm member for preventing the backward revolution of said crank shaft, a driven shaft, clutch means for connecting and disconnecting said driven shaft with said fly wheel, and neutral and reverse gear mechanism in connection with said drive shaft and said fly wheel in shiftable relation therewith.

14. In an automatic change speed transmission, a drum member in operative connection with the main shaft of an engine provided with slots in the periphery in opposed offset relation to each other, a crank shaft revolubly mounted in said drum, weights mounted on opposed crank portions of said crank shaft with their outer edges protruding through said slots in said drum each of said weights provided with a laterally extending arm, a connecting rod connected with each arm and its opposite end pivotally connected relatively to the drum at the opposite side of the drum from the weights, a fly wheel mounted in said drum revoluble relative to said drum and to said crank shaft, said fly wheel provided with a plurality of extended bell cranks pivotally mounted relatively to said fly wheel, friction disk means connected with said bell cranks and said drum for accelerating the movement of said fly wheel relatively to said drum by centrifugal action, a one-way clutch between said fly wheel and said crank shaft, an arm member provided with oppositely disposed arms secured to the one end of said crank shaft, a fly wheel revoluble relatively to said arm member, springs connecting the extended ends of said arms with said fly wheel, a one-way clutch in connection with said crank shaft adjacent said arm member for preventing the backward revolution of said crank shaft, a driven shaft, clutch means for connecting and disconnecting said driven shaft with said fly wheel, neutral and reverse gear mechanism in connection with said drive shaft and said fly wheel in shiftable relation therewith, and automatic means in connection with said driven shaft for retarding the movement of said driven shaft, and means for controlling said automatic means.

15. In an automatic change speed transmission, a drum member in operative connection with the main shaft of an engine provided with slots in the periphery in opposed offset relation to each other, a crank shaft revolubly mounted in said drum, weights mounted on opposed crank portions of said crank shaft with their outer edges protruding through said slots in said drum each of said weights provided with a laterally extending arm, a connecting rod connected with each arm and its opposite end pivotally connected relatively to the drum at the opposite side of the drum from the weights, a fly wheel mounted in said drum revoluble relatively to said drum and to said crank shaft, said fly wheel provided with a plurality of extended bell cranks pivotally mounted relatively to said fly wheel, friction disk means connected with said bell cranks and said drum for accelerating the movement of said fly wheel relatively to said drum by centrifugal action, a one-way clutch between said fly wheel and said crank shaft, an arm member provided with oppositely disposed arms secured to the one end of said crank shaft, a fly wheel revoluble relatively to said arm member, springs connecting the extended ends of said arms with said fly wheel, a one-way clutch in connection with said crank shaft adjacent said arm member for preventing the backward revolution of said crank shaft, and manually operated means for controlling said one-way clutch.

16. In an automatic change speed transmission, a drum member in operative connection with the main shaft of an engine provided with slots in the periphery in opposed offset relation to each other, a crank shaft revolubly mounted in said drum, weights mounted on opposed crank portions of said crank shaft with their outer edges protruding through said slots in said drum each of said weights provided with a laterally extending arm, a connecting rod connected with each arm and its opposite end pivotally connected relatively to the drum at the opposite side of the drum from the weights, a fly wheel mounted in said drum revoluble relative to said drum and to said crank shaft, said fly wheel provided with a plurality of extended bell cranks pivotally mounted relatively to said fly wheel, friction disk means connected with said bell cranks and said drum for accelerating the movement of said fly wheel relatively to said drum by centrifugal action, a one-way clutch between said fly wheel and said crank shaft, an arm member provided with oppositely disposed arms secured to the one end of said crank shaft, a fly wheel revoluble relatively to said arm member, springs connecting the extended ends of said arms with said fly wheel, a one-way clutch in connection with said crank shaft adjacent said arm member for preventing the backward revolution of said crank shaft, a driven shaft, clutch means for connecting and disconnecting said driven shaft with said fly wheel, neutral and reverse gear mechanism in connection with said drive shaft and said fly wheel in shiftable relation therewith, and automatic means in connection with said driven shaft for retarding the movement of said driven shaft, means for controlling said automatic means, and adjustable valve means for relieving the pressure of said automatic valve means.

17. In an automatic change speed transmission, the combination of a driving member, a driven member, means actuated by said driven member for producing turning moments of one sense only, an inertia mass between the driven member and the propeller shaft, an arm member secured to the driven member and mounted yieldably within said inertia mass, and springs connecting the extended ends of said arms with said inertia mass whereby said inertia mass is turned by said driven member through said arms and springs, and an over-running clutch in connection therewith for preventing the driven member from reversing its sense of motion under tension of said springs.

18. In an automatic change speed transmission, a revolubly mounted drum, a crankshaft revoluble relatively to said drum, weights positioned in oppositely disposed relation to each other on separate crank portions of said crankshaft, each of said weights provided with laterally extending rigidly connected arms, and connecting rods connecting each of said arms with said drum on the opposite side of said drum from said weights, said arms extending at an angle of ninety degrees from the axis of said weight for the purpose of placing the main mass of said weights in oppositely disposed relation to said connecting rod point of connection to said drum during the instant of greatest centrifugal pull thereby preventing the creation of turning moments of opposite sense.

19. In an automatic change speed transmission, a revolubly mounted drum, a crankshaft revoluble relatively to said drum, weights positioned in oppositely disposed relation to each other on separate crank portions of said crankshaft, each of said weights provided with laterally extending rigidly connected arms, and connecting rods connecting each of said arms with said drum on the opposite side of said drum from said weights, said arms extending at an angle of ninety degrees from the axis of said weight, said arms of a length not less than twenty-three and not over twenty-five percent longer than said crank throws and said arms so reversed and said connecting rods so positioned about the drum that said weights will reach a common point once in each three hundred sixty degrees whereby the transmission is held in synchronous drive under certain conditions.

ALBERT F. MARCOTT.